(12) United States Patent
Reinke et al.

(10) Patent No.: US 9,417,012 B2
(45) Date of Patent: Aug. 16, 2016

(54) HEAT EXCHANGER

(75) Inventors: Michael J. Reinke, Franklin, WI (US); Gregory A. Mross, Sturtevant, WI (US)

(73) Assignee: Modine Manufacturing Company, Racine, WI (US)

( * ) Notice: Subject to any disclaimer, the term of this patent is extended or adjusted under 35 U.S.C. 154(b) by 133 days.

(21) Appl. No.: 14/110,494

(22) PCT Filed: Apr. 16, 2012

(86) PCT No.: PCT/US2012/033736
§ 371 (c)(1),
(2), (4) Date: Oct. 8, 2013

(87) PCT Pub. No.: WO2012/145262
PCT Pub. Date: Oct. 26, 2012

(65) Prior Publication Data
US 2014/0026577 A1    Jan. 30, 2014

Related U.S. Application Data

(60) Provisional application No. 61/476,829, filed on Apr. 19, 2011.

(51) Int. Cl.
*F28D 9/00* (2006.01)
*F01N 5/02* (2006.01)
(Continued)

(52) U.S. Cl.
CPC ............ *F28D 9/0093* (2013.01); *F01K 13/006* (2013.01); *F01N 3/0205* (2013.01); *F01N 3/0234* (2013.01); *F01N 5/02* (2013.01);
(Continued)

(58) Field of Classification Search
CPC ............. F28D 1/00; F28D 9/00; F28D 15/00; F01K 13/00
See application file for complete search history.

(56) References Cited

U.S. PATENT DOCUMENTS 3,587,731 A * 6/1971 Hays .................. F25J 1/0022
165/140
3,847,211 A * 11/1974 Fischel .................. B01D 53/22
165/166

(Continued)

FOREIGN PATENT DOCUMENTS

WO    2012145262    10/2012

OTHER PUBLICATIONS

International Search Report and Written Opinion for Application No. PCT/US2012/033736 dated Jul. 5, 2012 (16 pages).
(Continued)

*Primary Examiner* — Jesse Bogue
*Assistant Examiner* — Shafiq Mian
(74) *Attorney, Agent, or Firm* — Michael Best & Friedrich LLP

(57) ABSTRACT

A heat exchanger and a method are provided to vaporize a working fluid using a heat sourcing fluid. The heat exchanger includes a first section, a second section, and a third section. A first portion of the heat sourcing fluid passes through the first section, in counter-flow with the working fluid. A second portion of the heat sourcing fluid passes through the second section, in co-flow with the working fluid. Both the first and second portions pass through the third section, in overall counter-flow with the working fluid. The working fluid passes sequentially through the third section, the first section, and the second section. The heat exchanger and/or the method may be used in a Rankine cycle for waste heat recovery or in a refrigerant cycle.

24 Claims, 11 Drawing Sheets

(51) Int. Cl.
  *F28D 21/00* (2006.01)
  *F01N 3/02* (2006.01)
  *F01N 3/023* (2006.01)
  *F01K 13/00* (2006.01)

(52) U.S. Cl.
  CPC ............... *F28D9/00* (2013.01); *F28D 9/0068* (2013.01); *F28D 21/0003* (2013.01); *F01N 2240/02* (2013.01); *F28D 2021/0064* (2013.01); *F28D 2021/0085* (2013.01); *Y02T 10/121* (2013.01); *Y02T 10/16* (2013.01); *Y02T 10/166* (2013.01)

(56) References Cited

U.S. PATENT DOCUMENTS

| | | | | |
|---|---|---|---|---|
| 5,187,946 | A * | 2/1993 | Rotenberg | F24F 5/0007 165/166 |
| 5,755,280 | A * | 5/1998 | da Costa | B01D 1/221 165/140 |
| 6,321,835 | B1 * | 11/2001 | Damsohn | F28D 7/0041 165/109.1 |
| 6,536,231 | B2 * | 3/2003 | Gupte | F25B 1/00 165/140 |
| 6,615,590 | B1 * | 9/2003 | Yaegashi | F28D 9/0075 165/164 |
| 6,668,537 | B1 | 12/2003 | Hays | |
| 6,936,364 | B2 * | 8/2005 | Reinke | F28D 9/0068 422/198 |
| 6,953,009 | B2 * | 10/2005 | Reinke | F28D 9/005 122/31.1 |
| 7,762,090 | B2 * | 7/2010 | Lee | B01D 5/0015 165/113 |
| 2001/0054501 | A1 | 12/2001 | Wehrmann et al. | |
| 2003/0145609 | A1 * | 8/2003 | Maisotsenko | F24F 3/1411 62/121 |
| 2005/0056412 | A1 * | 3/2005 | Reinke | F28D 9/005 165/167 |
| 2005/0217834 | A1 * | 10/2005 | Valensa | F28D 1/0478 165/150 |
| 2005/0284691 | A1 * | 12/2005 | Voss | F01N 1/003 181/255 |
| 2006/0115393 | A1 * | 6/2006 | Reinke | B01J 19/249 422/198 |
| 2006/0231243 | A1 * | 10/2006 | Sugihara | F28D 7/0066 165/158 |
| 2007/0144349 | A1 * | 6/2007 | Voss | C01B 3/0005 96/108 |
| 2007/0261815 | A1 * | 11/2007 | Melby | F02B 29/0462 165/41 |
| 2007/0267000 | A1 | 11/2007 | Raduenz et al. | |
| 2008/0006398 | A1 * | 1/2008 | Schatz | F28D 7/1684 165/177 |
| 2008/0029257 | A1 | 2/2008 | Nilsson | |
| 2008/0115922 | A1 * | 5/2008 | Horek | F28D 9/00 165/240 |
| 2009/0272515 | A1 * | 11/2009 | Wu | F02B 29/0462 165/140 |
| 2009/0313993 | A1 | 12/2009 | Bausch et al. | |
| 2010/0084120 | A1 * | 4/2010 | Yin | F22B 27/00 165/146 |
| 2010/0282452 | A1 * | 11/2010 | Diem | F01K 23/065 165/167 |
| 2011/0030931 | A1 * | 2/2011 | Orito | B21D 11/08 165/121 |

OTHER PUBLICATIONS

International Preliminary Report on Patentability for Application No. PCT/US2012/033736 dated Oct. 31, 2013 (2 pages).

* cited by examiner

HEAT EXCHANGER

CROSS REFERENCE TO RELATED APPLICATIONS

This application claims priority to U.S. Provisional Patent Application No. 61/476,829, filed Apr. 19, 2011, the entire contents of which are hereby incorporated by reference herein.

BACKGROUND

The present invention relates to heat exchangers.

Increasing the operating efficiency of heat engines and other power producing cycles has become more desirable as the cost of fuels has steadily increased. Additionally, the desire by both individuals and governmental bodies to reduce pollutants and other undesirable byproducts of fuel consumption has led to further interest in such increases. One recognized means by which such increases may be realized is waste heat recovery.

In a typical waste heat recovery system, thermal energy produced as a byproduct of a fuel-consuming process that would otherwise be wasted (e.g. discharged to the ambient as a waste stream) is captured and converted to useful work. One well-known thermodynamic cycle used for waste heat recovery is the Rankine cycle, wherein a working fluid is pressurized as a liquid, vaporized by receiving the waste heat, non-adiabatically expanded to recover mechanical work, and condensed and cooled to complete the cycle.

While it may be highly desirable to maximize the conversion efficiency of such a waste heat recovery cycle, certain other considerations necessarily must be taken into account. Many of the working fluids that perform favorably in Rankine cycle waste heat recovery systems are sensitive to breakdown of the fluid at elevated temperatures, necessitating regulation of the peak temperature to which such a fluid is heated. In addition, certain additives to the fluid such as, for example, lubricants for the expander, may have an upper temperature rating.

As a further complication, it may be necessary in some systems to control or regulate the temperature to which the waste stream is cooled. As one example, catalytic after-treatment of the waste stream may necessitate that the stream is within a certain temperature range, in order that the activity of the catalyst may be suitable for the desired reactions.

Another example of the need to regulate the temperature of the waste stream can be found in exhaust gas recirculation (EGR) systems for internal combustion engines. In such a system, a high temperature exhaust gas stream is recycled from the exhaust manifold of an internal combustion engine back to the intake manifold of the engine. An EGR system may be used on a diesel or gasoline fueled compression ignition or spark ignition engine of a vehicle such as an automobile or truck, in order to reduce undesirable NOx emissions from the engine. In order to be successful at reducing those emissions, however, the recycled exhaust gas stream must be cooled to a much lower temperature than that at which it exits the exhaust manifold of the engine. Accordingly, waste heat must be rejected from the exhaust, and recovery of that waste heat through a Rankine cycle may advantageously be used to improve the efficiency of the vehicle.

The need to regulate the temperature of the vaporized working fluid and the need to regulate the temperature of the waste heat stream may oftentimes be at odds with one another, creating difficulties in the design of heat exchangers for such a system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
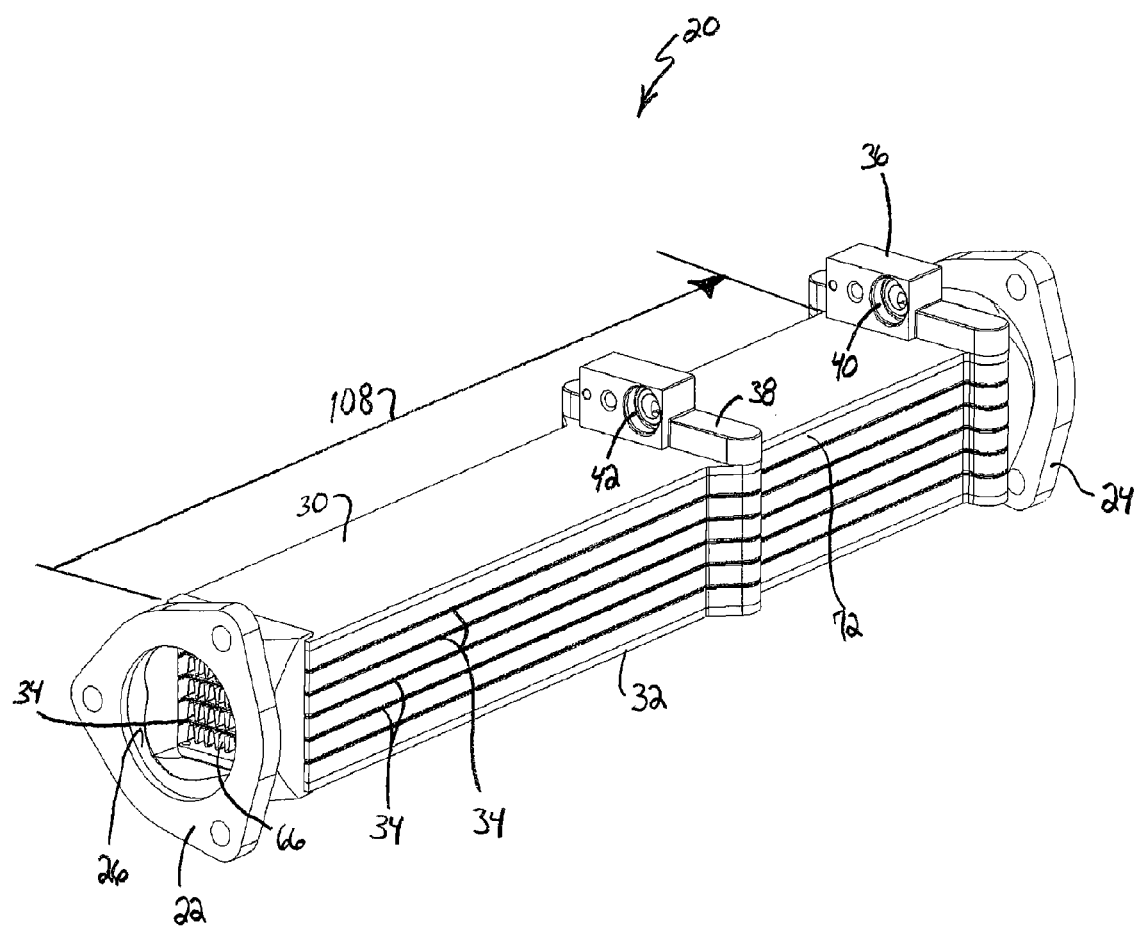
FIG. 1 is a perspective view of a heat exchanger according to a first embodiment of the invention.

FIG. 1 illustrates a heat exchanger 20, which is an exhaust gas recirculation (EGR) cooler in the illustrated embodiment. The illustrated heat exchanger 20 includes a first connector 22 and a second connector 24. The first connector 22 defines a heat sourcing fluid inlet 26 (e.g., a gas inlet 26) of the heat exchanger 20 and the second connector 24 defines a heat sourcing fluid outlet 26 (e.g., a gas outlet 28) (FIG. 2) of the heat exchanger 20. A top plate 30 extends between the first connector 22 and the second connector 24, and a bottom plate 32 extends between the first connector 22 and the second connector 24 opposite the top plate 30. A plurality of plate assemblies 34 are located between the top plate 30 and the bottom plate 32.

An inlet manifold 36 and an outlet manifold 38 are coupled to and extend from the top plate 30. The inlet manifold 36 defines a working fluid inlet 40 of the heat exchanger 20 and the outlet manifold 38 defines a working fluid outlet 42 of the heat exchanger 20. The inlet manifold 36 provides fluid communication of a working fluid to each of the plurality of plate assemblies 34 and the outlet manifold 38 provides fluid communication from each of the plurality of plate assemblies 34.

Figure 2:
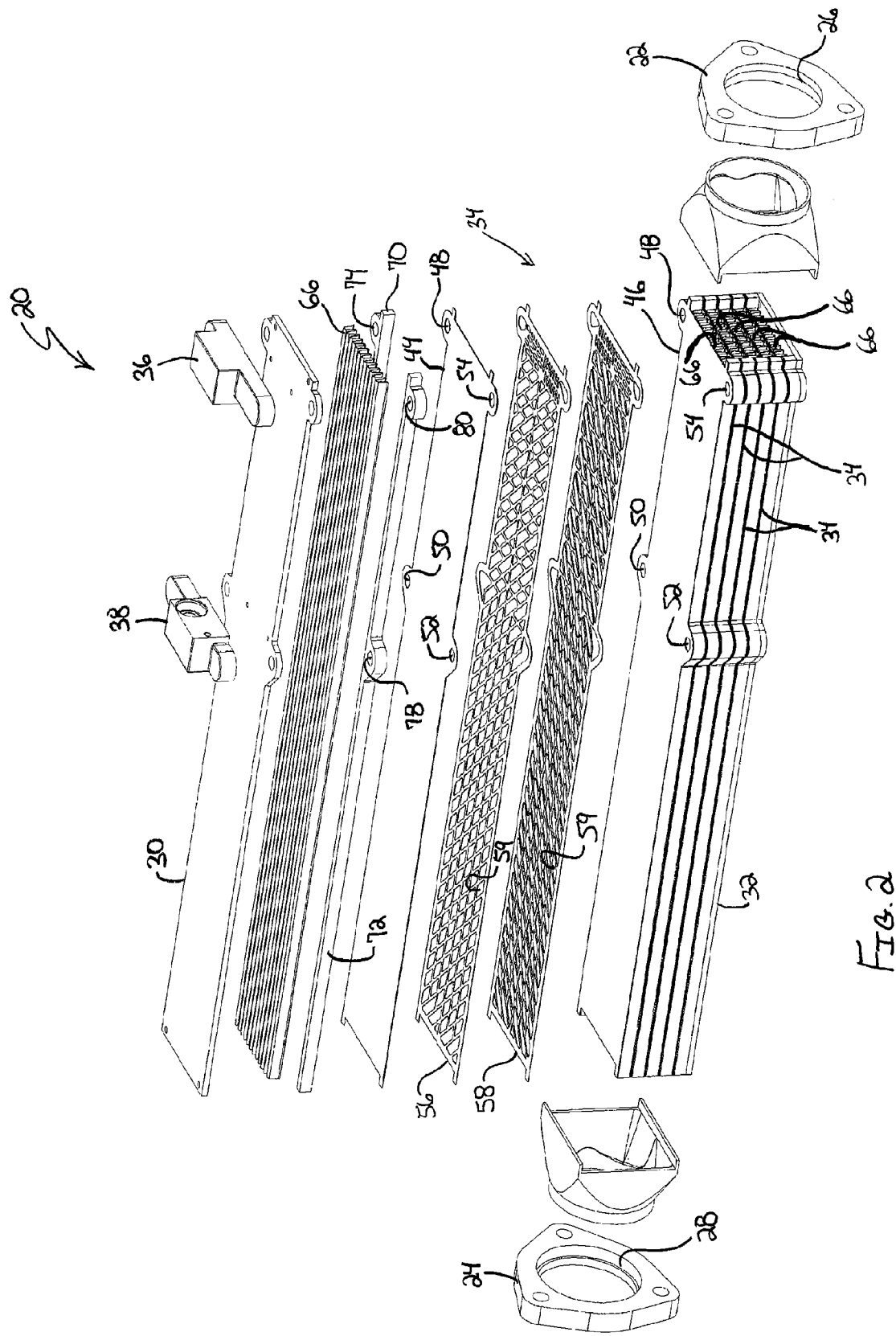
FIG. 2 is an exploded view of the heat exchanger of FIG. 1.
Figure 3:
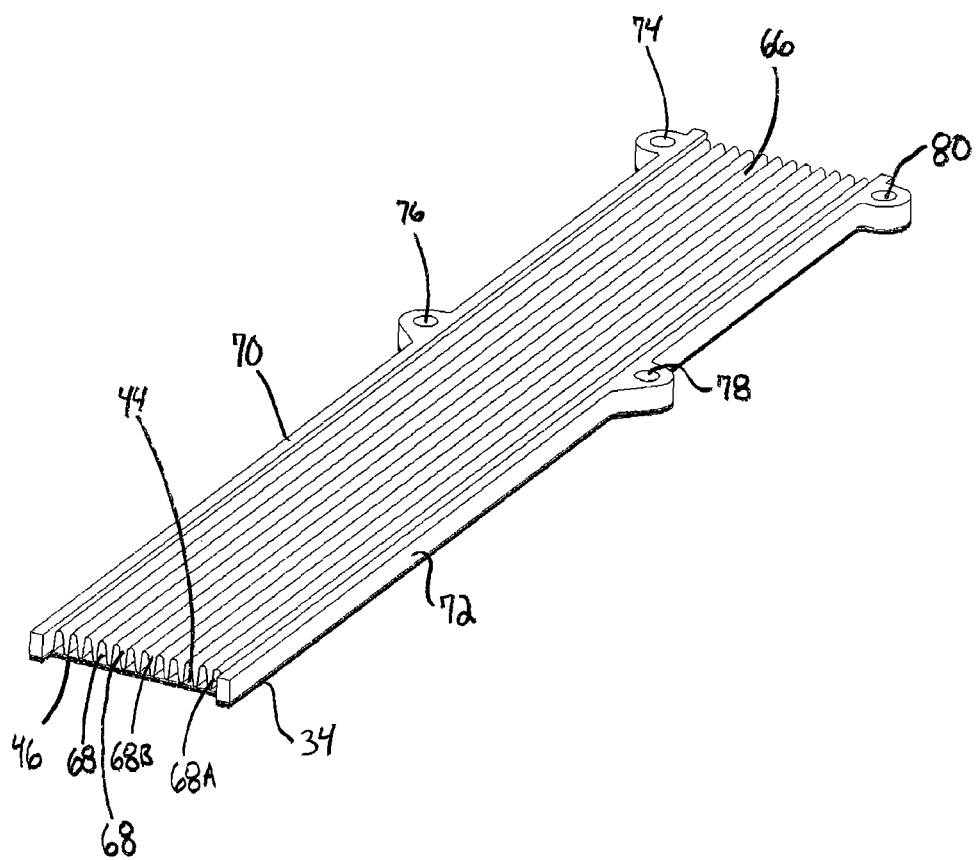
FIG. 3 is a perspective view of a portion of the heat exchanger of FIG. 1.
Figure 4:
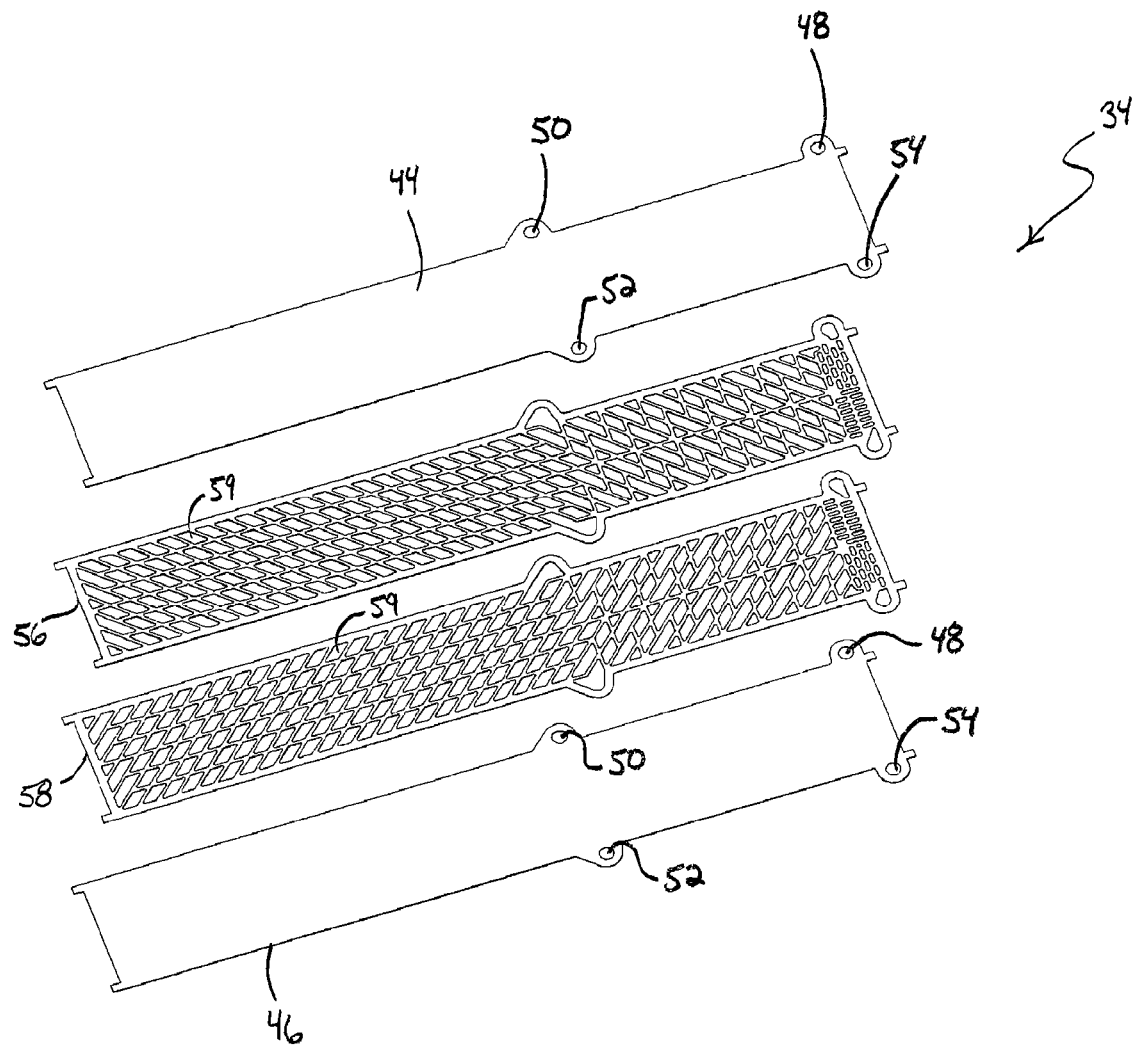
FIG. 4 is an exploded view of a plate assembly of the heat exchanger illustrated in FIG. 1.
Figure 5:
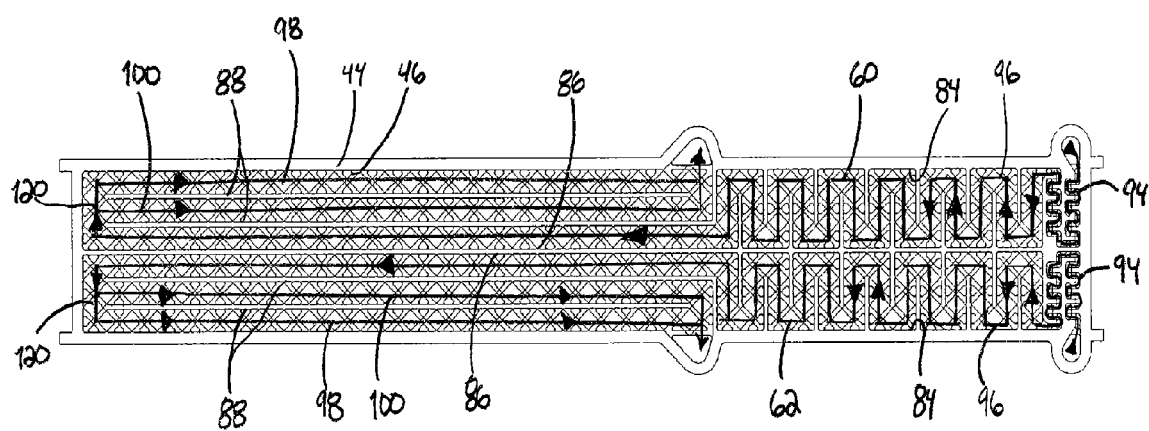
FIG. 5 is a top view of a pair of inserts of the plate assembly of FIG. 4.

Each of the plate assemblies 34 are substantially the same, and in some embodiments, generally identical. Therefore, only one of the plate assemblies 34 will be described in detail below. Referring to FIGS. 2-4, the plate assembly 34 includes a first plate 44 and a second plate 46. The first and second plates 44 and 46 each include apertures 48, 50, 52, and 54 located at the outer periphery of the plates 44 and 46. A first insert 56 and a second insert 58 are located between the plates 44 and 46. The first and second inserts 56 and 58 each include a plurality of cut-outs 59 such that when the plates are directly coupled together (FIG. 5) the cut-outs 59 of the inserts 56 and 58 partially overlap and define a first working fluid flow path 60 and a second working fluid flow path 62 between the plates 44 and 46. The first and second working fluid flow paths 60 and 62 are schematically illustrated in FIG. 5. In the illustrated embodiment, the inserts 56 and 58 are identical components with the same configuration of cut-outs 59 and the inserts 56 and 58 are flipped relative to each other, as best seen in FIG. 4, to define the first and second flow paths 60 and 62 illustrated in FIG. 5. Also, although in the illustrated embodiment the inserts 56 and 58 define two working fluid flow paths 60 and 62, in other embodiments, the inserts may define only a single working fluid flow path or more than two working fluid flow paths. Additional details of the illustrated working fluid flow paths 60 and 62 will be discussed in more detail below.

As best seen in FIGS. 1-3, a fin 66 is located between adjacent plate assemblies 34, as well as between the outermost ones of the plate assemblies 34 and the top and bottom plates 30, 32. Each of the fins 66 is generally an identical component, and therefore, only one of the fins 66 (FIG. 3) will be described in detail below. The illustrated fin 66 is corrugated and defines a plurality of conduits 68. The conduits 68 are defined by the corrugations and adjacent plates (e.g. 44, 46, 30, 32) and the conduits 68 generally extend from the gas inlet 26 to the gas outlet 28 in a direction parallel to and along a longitudinal axis of the heat exchanger 20.

With continued reference to FIGS. 1-3, a first rail 70 and a second rail 72 extend along the fin 66 and on top of the plate assembly 34. The rails 70 and 72 separate the plate assemblies 34 to provide an area for the fin 66. The rails 70, 72 are generally identical components in the illustrated construction, and the rail 70 includes apertures 74 and 76 and the rail 72 includes the apertures 78 and 80. The apertures 74, 76, 78, 80 provide fluid communication between respective apertures 48, 50, 52, 54 of the plate assemblies 34.

Figure 6:
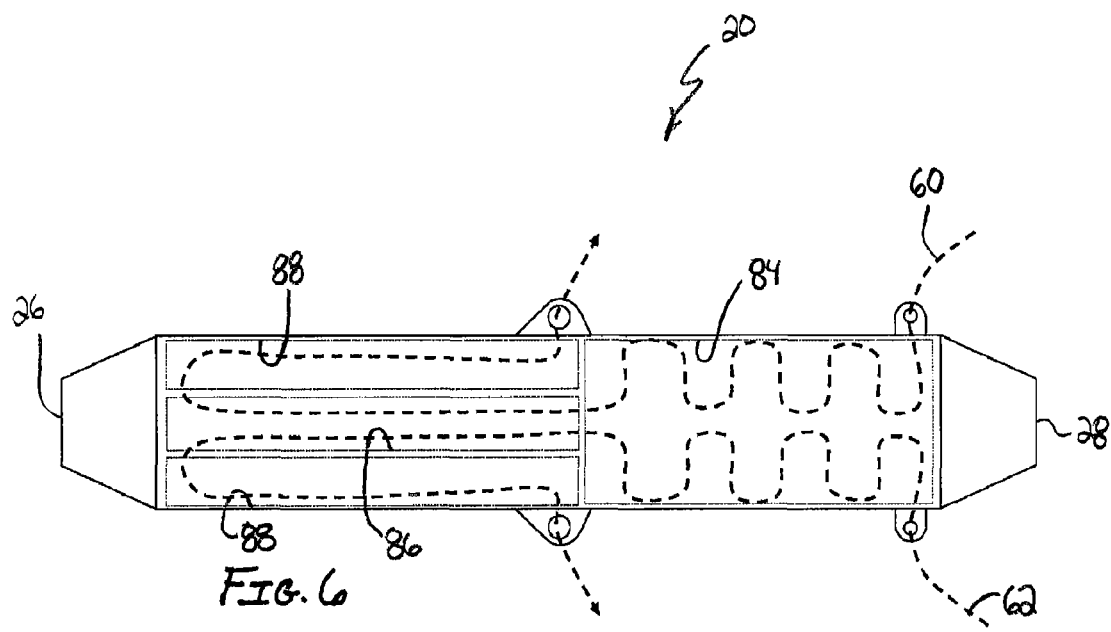
FIG. 6 is a schematic flow diagram of a working fluid flow through the heat exchanger of FIG. 1.

Referring to FIGS. 5-6, the working fluid flow paths 60, 62 each pass through a first heat exchange section 84, a second heat exchange section 86, and a third heat exchange section 88. Generally, the flow of the working fluid through the first heat exchange section 84 is in a cross-counter flow arrangement with respect to the heat sourcing fluid flow (e.g., exhaust gas flow) passing through that same section. The exhaust gas flow is generally represented by arrows 92 of FIG. 7. As best seen in FIG. 5, the first heat exchange section 84 includes a first cross-counter flow path section 94 of the working fluid flow and a second cross-counter flow path section 96 of the working fluid flow. The first cross-counter flow path section 94 defines a more tortuous flow path, including alternating counter and co-flow arrangements, than the second cross-counter flow path section 96. The first cross-counter flow path section 94 is upstream, with respect to the fluid flow direction, from the second cross-counter flow path section 96. Also, the first counter-cross flow path section 94, having the more tortuous flow path is located adjacent the working fluid inlet 40.

Figure 7:
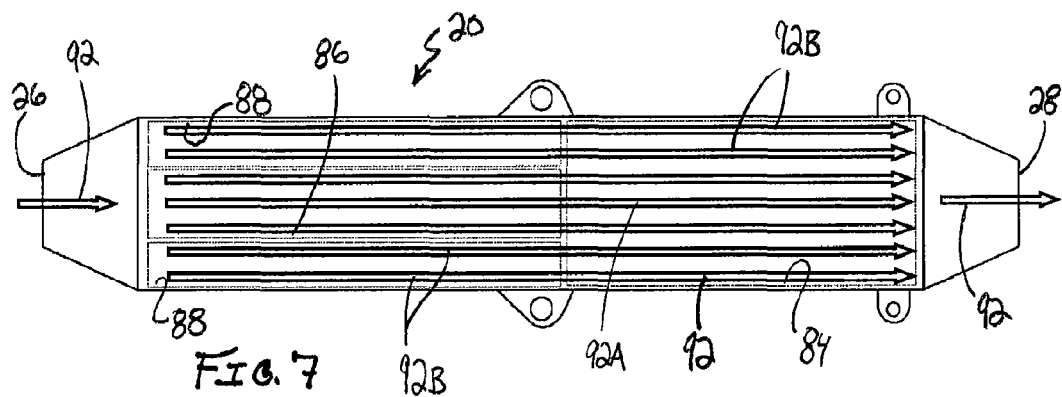
FIG. 7 is a schematic flow diagram of a heat sourcing fluid flow through the heat exchanger of FIG. 1.

The second heat exchange section 86 is immediately downstream from the first heat exchange section 84 relative to the working fluid flow direction, which is represented by the arrows 92 in the flow paths 60 and 62. The working fluid in the second heat exchange section 86 is in a parallel counter flow arrangement with the exhaust gas flow 92 through that same section. As shown in FIG. 7, only a portion 92A of the exhaust flow 92 passes through the second heat exchange section 86. The third heat exchange section 88 is immediately downstream (relative to the working fluid flow) from the second heat exchange section 86. The working fluid in the third heat exchange section 88 is in a parallel co-flow arrangement with the exhaust gas flow 92 through that same section. As shown in FIG. 7, only a portion 92B of the exhaust flow 92 passes through the third heat exchange section 88. The portion 92B bypasses the second heat exchange section 86 and, similarly, the portion 92A bypasses the third heat exchange section 88. In the illustrated embodiment, the third heat exchange section 88 includes a first flow path 98 of the working fluid and a second flow path 100 of the working fluid. The first and second flow paths 98 and 100 are arranged in parallel and provide separate flow paths from the second heat exchange section 86 through the third heat exchange section 88.

Figure 12:
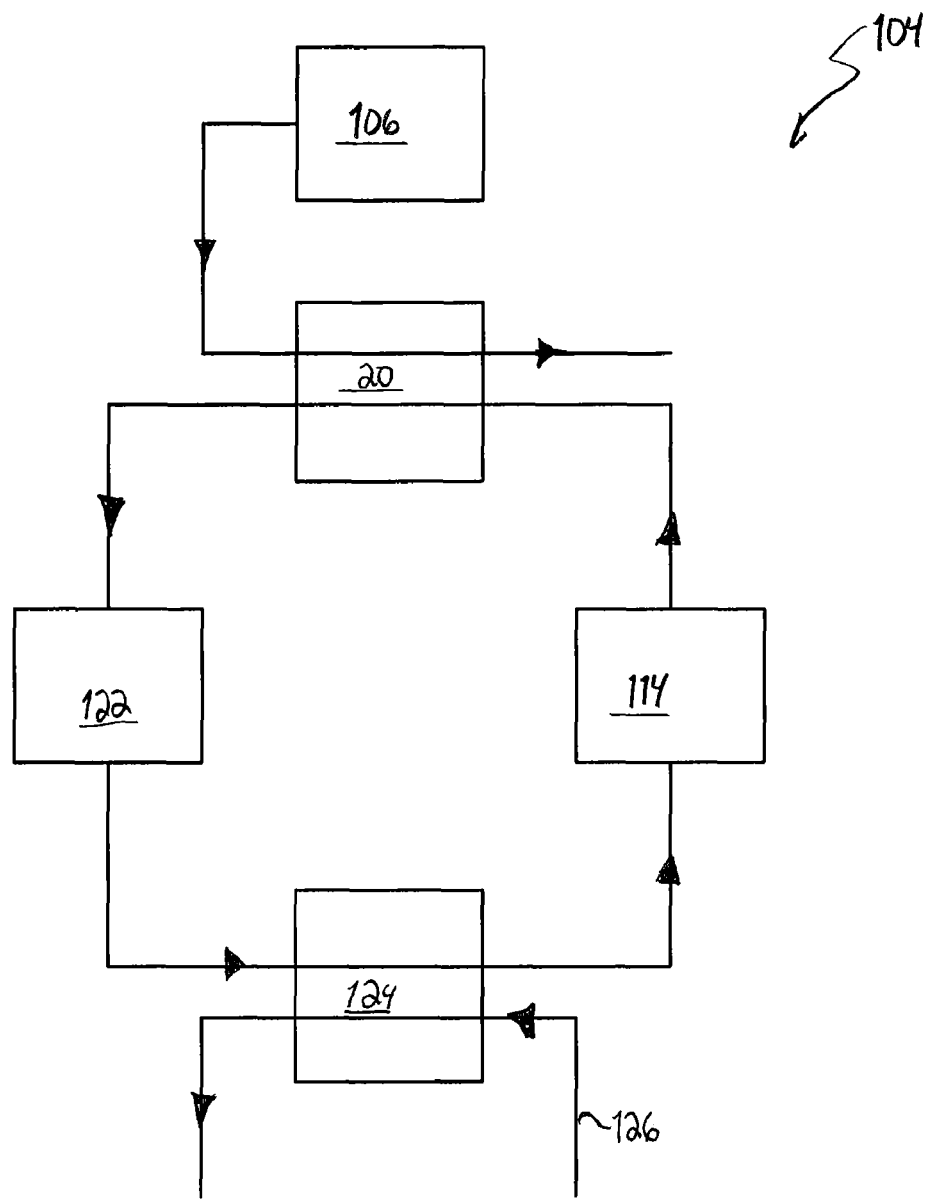
FIG. 12 is a schematic illustration of a Rankine cycle system according to another embodiment of the invention.
Figure 13:
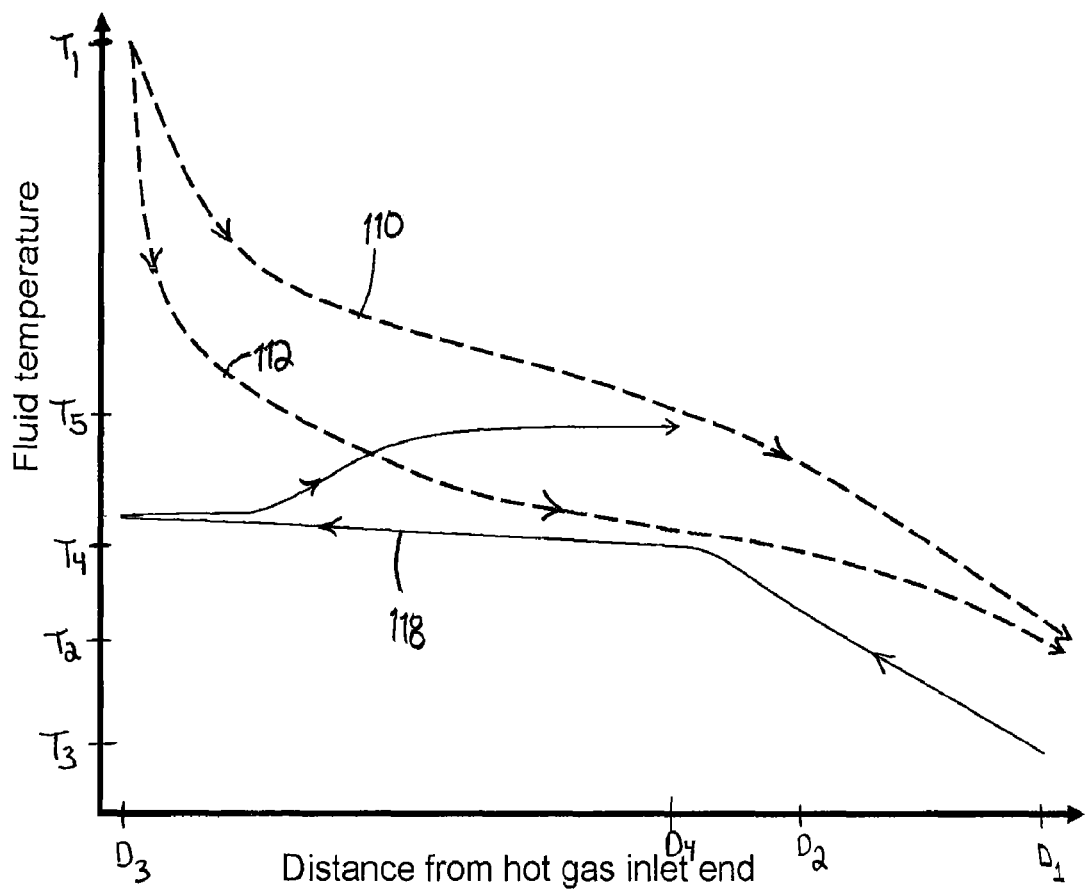
FIG. 13 is a graphical representation of operation of the heat exchanger of FIG. 1.

In operation, referring to FIGS. 1 and 12, the heat exchanger 20 can be used in a Rankine cycle 104 schematically illustrated in FIG. 12 to evaporate a working fluid using a heat sourcing fluid, which includes a hot exhaust gas in the illustrated embodiment. FIG. 13 graphically illustrates the temperature of the gas and the working fluid versus a variable distance 108 (FIG. 1) from the gas inlet 26, and the graph of FIG. 13 will be discussed in more detail below. The distance 108 is measured parallel to and along the longitudinal axis of the heat exchanger 20 and parallel to and along the gas flow conduits 68.

The illustrated heat exchanger 20 receives a hot exhaust gas flow from a heat sourcing fluid source 106 (FIG. 12), such as an exhaust gas manifold of an internal combustion engine. The exhaust gas flow enters the heat exchanger 20 through the inlet 26 at an inlet temperature $T_1$ (FIG. 13). Then, exhaust gas flow is separated into a plurality of parallel flow portions each defined by one or more of the gas flow conduits 68. The dashed line 110 of FIG. 13 represents the temperature of a first exhaust flow portion 92B (FIG. 7), including the flow passing through the conduit labeled 68A in FIG. 3, and the dashed line 112 of FIG. 13 represents the temperature of a second exhaust flow portion 92A (FIG. 7) including the flow passing through the conduit 68B in FIG. 3. The exhaust gas travels through the conduits 68 and is recombined adjacent the gas outlet 28 (FIG. 7) before exiting the heat exchanger 20 at the temperature $T_2$ (FIG. 13). It should be observed that, while all of the conduits 68 extend through the first heat exchange section 84, the conduit 68A extends through the third heat exchange section 88 but not the second heat exchange section 86, and the conduit 68B extends through the second heat exchange section 86 but not the third heat exchange section 88.

Referring to FIG. 12, a working fluid pump 114 of the Rankine cycle 104 pumps the working fluid to the heat exchanger 20. A flow of working fluid is received in the heat exchanger 20 by the inlet 40 and divided by the inlet manifold 36. About half of the working fluid flow is divided and directed to flow through apertures 74 and 48 (FIGS. 3 and 4) to be distributed to the plate assemblies 34 to create the first flow path 60 and about half of the working fluid flow is divided and directed to flow through apertures 80 and 54 (FIGS. 3 and 4) to create the second flow path 62. Both flow paths 60 and 62 are substantially the same, and therefore, only the flow path 62 for one of the plate assemblies 34 will be discussed in detail below.

Referring to FIG. 13, the working fluid enters the plate assembly 34 at a distance $D_1$ from the gas inlet 26 and at a temperature $T_3$. After entering the plate assembly 34, the working fluid flows through the first cross-counter flow path section 94 (FIG. 5) having the tortuous flow path and defining a working fluid distribution region. The tortuous flow path creates a relatively large pressure drop of the working fluid to inhibit instability of the working flow downstream when it becomes a two-phase mixture of fluid and gas. The working fluid then flows to the second cross-counter flow path section 96. When the working fluid flows through the first heat exchange section 84 containing the flow path section 96, generally in cross-counter flow with respect to the exhaust gas flow, heat is transferred from both the exhaust gas portions 92A and 92B (FIG. 7) to the working fluid in the working fluid flow paths 60, 62. Therefore, the temperature of the working fluid flow, represented by line 118 of FIG. 13, increases from the temperature $T_3$ as the working fluid travels through the first heat exchange section 84, which ends at about the distance $D_2$. In the exemplary operating condition shown in FIG. 13 the working fluid remains a single phase liquid throughout the first heat exchange section 84.

After the first heat exchange section 84, the working fluid flows in to the second heat exchange section 86, wherein the working fluid is in a parallel counter flow arrangement with the exhaust gas flow. In the second heat exchange section 84, heat is transferred from the exhaust gas flow portion 92A (the temperature of which is indicated by line 112 of FIG. 13), but generally not from the exhaust gas flow portion 92B (the temperature of which is indicated by line 110 of FIG. 13). Heat is transferred in the second heat exchange section 84 to increase the temperature of the working fluid to a saturation temperature $T_4$ where the working fluid transitions to a two phase mixture of liquid and gas. As the two phase working fluid continues through the second heat exchange section 86, additional heat is transferred from the exhaust gas flow portion 92A to the working fluid as latent heat, increasing the vapor quality of the working fluid. The working fluid continues along the second heat exchange section 86 until a cross-flow turn 120 at distance $D_3$ where the working fluid enters the third heat exchange section 88. The working fluid in the third heat exchange section is in a parallel co-flow arrangement with the exhaust gas flow. In the third heat exchange section 88, heat is transferred from the exhaust gas flow portion 92B, but generally not from the exhaust gas flow portion 92A. Heat is transferred in the third heat exchange section 88 to fully vaporize the working fluid, and to superheat the working fluid to a superheated temperature $T_5$ over the length of the working fluid flow path in the third heat exchange section 88, terminating at about distance $D_4$.

The superheated working fluid from the flow paths 60, 62 exits the plate assembly 34 through the apertures 52 and 78 (FIGS. 3 and 4) and then exits the heat exchanger 20 through the outlet 42 (FIG. 1). Referring to FIG. 12, the superheated working fluid is directed to an expander 122, such as a turbine, of the Rankine cycle 104 to convert the energy contained in the working fluid. After exiting the expander 122, the working fluid travels to a condenser 124 where it is cooled by a cooling source 126 and the working fluid is directed back to the pump 114 as a single phase liquid.

Certain advantages can be achieved in operating the Rankine cycle 104 in the above described manner. By providing only the portion 92A of the exhaust gas flow 92 to the second heat transfer section 86, the available heat that can be transferred from the exhaust gas to the working fluid in the second heat transfer section 86 is limited. As can be seen by the temperature line 112 in FIG. 13, the exhaust gas temperature is reduced down to approximately the working fluid saturation temperature $T_4$ in the second heat exchange section 86, which represents close to the maximum amount of heat that can be transferred between the two fluids in that heat exchange section. Due to the reduced mass flow of exhaust gas, heat so transferred is insufficient to fully vaporize working fluid flow, as evidenced by the two-phase region persisting into the third heat exchange section 88. By having the working fluid in a two-phase condition at the location $D_3$, where the exhaust gas temperature is at its highest level ($T_1$), thermal breakdown of the working fluid can be avoided.

The superheat temperature $T_5$ is similarly controlled to an acceptable level. By virtue of the reduced mass flow in the exhaust gas flow portion 92B passing through the third heat exchange section 88, the amount of heat that can be transferred to the working fluid within the third heat exchange section 88 is also limited. The co-flow orientation of the fluids within that section leads to a thermal pinch occurring at the temperature $T_5$, and further heating of the working fluid above the temperature $T_5$ can be prevented. Additional heat is still recovered from both exhaust gas portions 92A and 92B in the first heat exchange section 84 of the heat exchanger 20, so that the overall recovery of heat from the exhaust gas flow can be maximized. In addition, cooling down the temperature of the exhaust gas to the low temperature $T_2$ can provide advantages in reducing undesirable engine emissions (e.g. NOx) when the exhaust gas flow passing through the heat exchanger 20 is recirculated back to the engine as an EGR flow.

Figure 8:
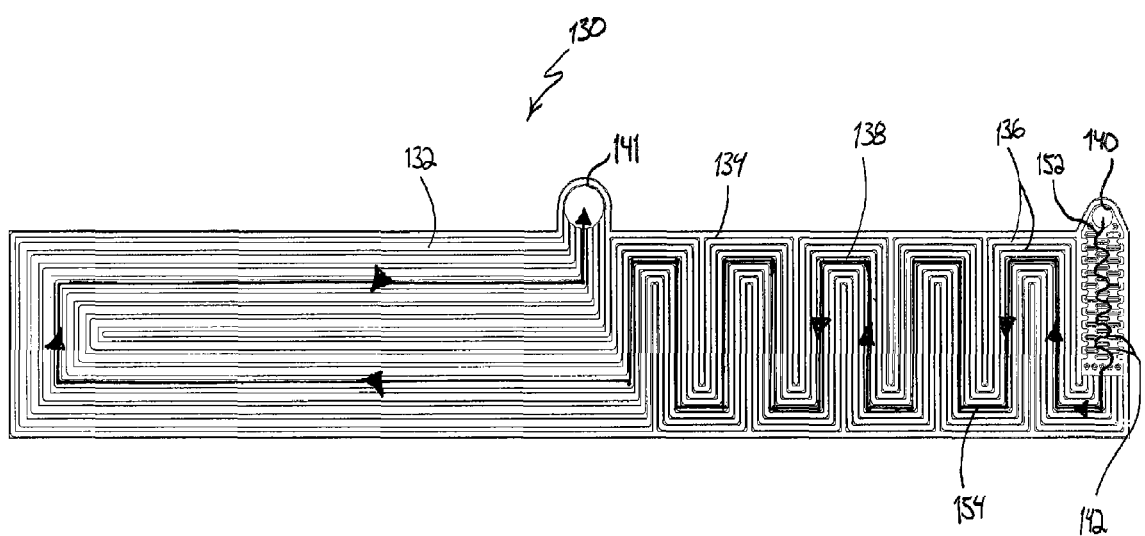
FIG. 8 is a top view of a plate for use in a heat exchanger according to a second embodiment of the invention.

FIG. 8 illustrates a formed plate 130 for use in a heat exchanger 131 (FIG. 10), which is similar to the heat exchanger 20 of FIG. 1. The formed plate 130 is used generally in lieu of the inserts 56 and 58 of the heat exchanger 20 (FIG. 4). The formed plate 130 has similar characteristics to the combined inserts 56 and 58, described above. Therefore, only differences between the heat exchanger 20 using the combined inserts 56 and 58 and the heat exchanger 131 using the formed plate 130 will be described in detail below.

Figure 9:
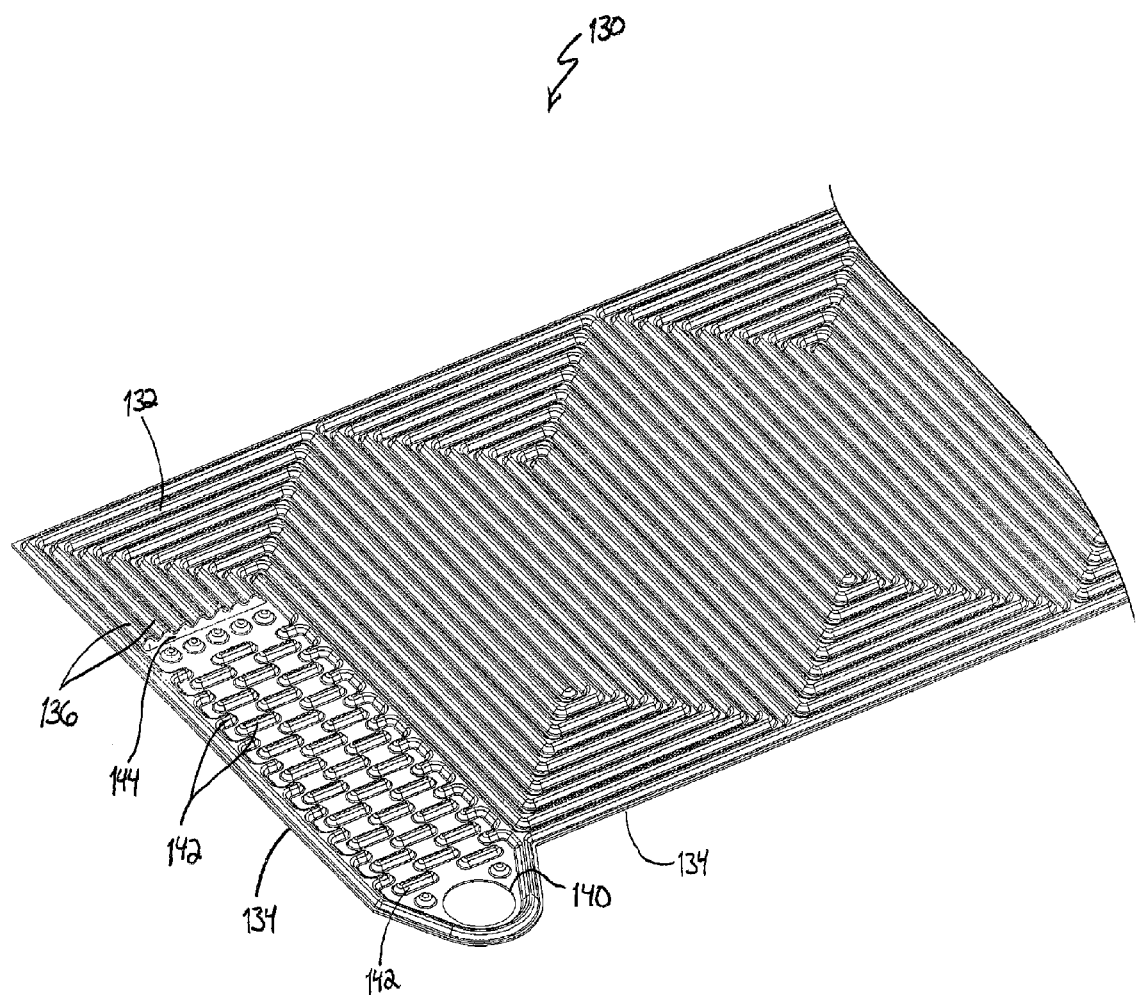
FIG. 9 is a perspective view of a portion of the plate of FIG. 8.

Referring to FIGS. 8 and 9, the formed plate 130 includes a first side 132 and a second side 134, and when assembled with the heat exchanger 131, the formed plate 130 is placed between plates similar to the plates 44 and 46 of the heat exchanger 20 (FIG. 2). Corrugations 136 are formed in the plate 130, and the corrugations 136 are arranged to define a working fluid flow path 138 on the first side 132 and the second side 134 of the plate 130. The plate 130 further includes an inlet aperture 140, an outlet aperture 141, and a plurality of discreet projections 142 adjacent the inlet aperture 140. A slot 144 extends through the plate 130 between the projections 142 and the corrugations 136. In one embodiment, the plate 130 is formed by stamping.

Figure 10:
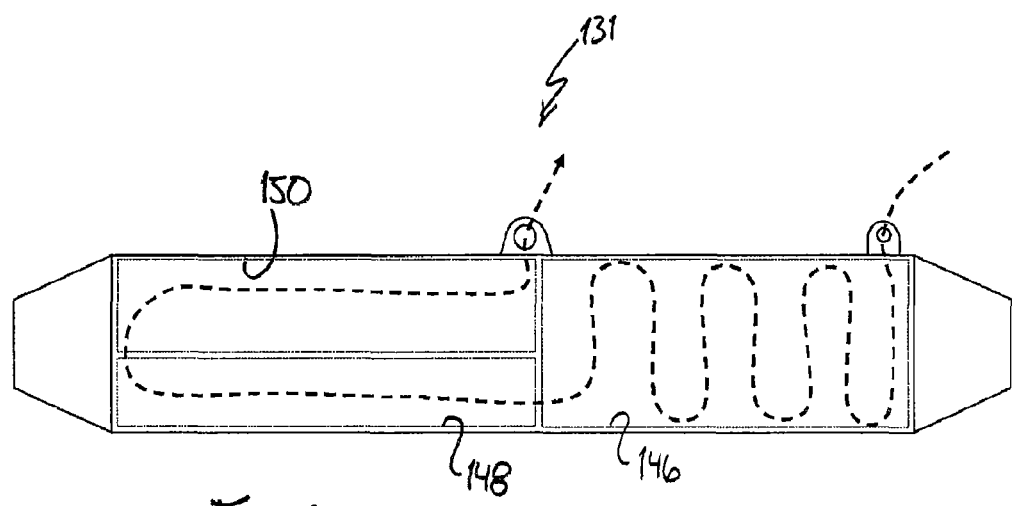
FIG. 10 is a schematic flow diagram of a working fluid flow through a heat exchanger including the plate assembly of FIG. 8, according to a second embodiment of the invention.
Figure 11:
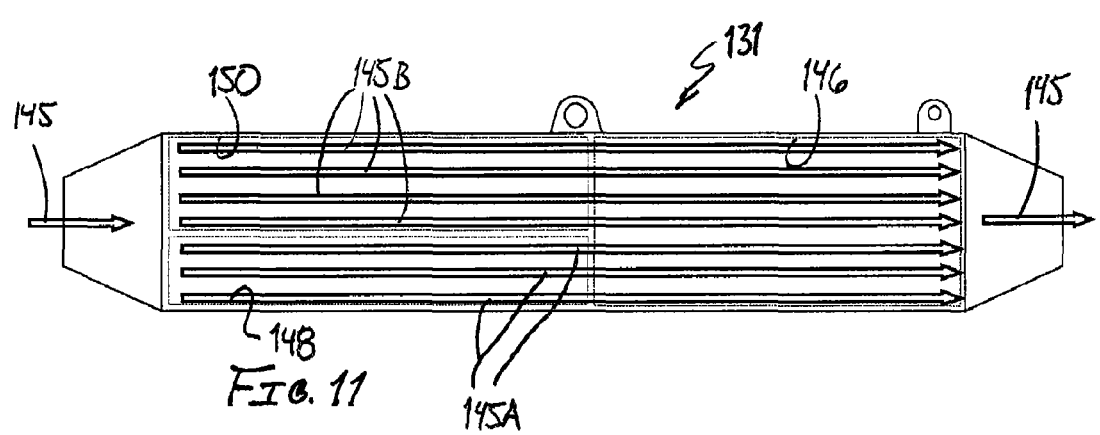
FIG. 11 is a schematic flow diagram of a heat sourcing fluid flow through a heat exchanger including the plate assembly of FIG. 8, according to a second embodiment of the invention.

Referring to FIGS. 8 and 10, the working fluid flow path 138 is similar to the working fluid flow paths 60 and 62 described above. The working fluid flow path 138 passes through a first heat exchange section 146, a second heat exchange section 148, and a third heat exchanger section 150. Generally, the flow of the working fluid through the first heat exchange section 146 is in a cross-counter flow arrangement with respect to the exhaust gas flow passing through the first heat exchange section 146. The exhaust gas flow is generally represented by arrows 145 of FIG. 11. The first heat exchange section 146 includes a first cross-counter flow path section 152 of the working fluid flow 138 and a second cross-counter flow path section 154 of the working fluid flow 138. The first cross-counter flow path section 152 includes the projections 142 and defines a more tortuous flow path, including alternating counter and co-flow arrangements, than the second cross-counter flow path section 154. The first cross-counter flow path section 152 is upstream, with respect to the fluid flow direction, from the second-cross counter flow path section 154. In operation, the working fluid passes through the inlet aperture 140, travels between the projections 142, and then a portion of the working fluid passes through the slot 144. The portion of the working fluid that passes through the slot 144 travels through the working fluid flow path 138 on the second side 134 of the plate while the remainder travels through the working fluid flow path 138 on the first side 132 of the plate 130 until the two portions are combined at the outlet aperture 141.

The second heat exchange section 148 is immediately downstream from the first heat exchange section 146 relative to the working fluid flow direction, which is represented by the arrows in the flow path 138. The working fluid in the second heat exchange section 148 is in a parallel counter flow arrangement with the exhaust gas flow 145 through that same section. As shown in FIG. 10, only a portion 145A of the exhaust flow 145 passes through the second heat exchange section 148. The third heat exchange section 150 is immediately downstream (relative to the working fluid flow) from the second heat exchange section 148. The working fluid in the third heat exchange section 150 is in a parallel co-flow arrangement with the exhaust gas flow 145 through that same section. As shown in FIG. 10, only a portion 145B of the exhaust flow 145 passes through the third heat exchange section 150. The portion 145B bypasses the second heat exchange section 148 and, similarly, the portion 145A bypasses the third heat exchange section 150.

Although the illustrated plate 130 includes only a single working fluid flow path 138 on each side 132 and 134 of the plate 130, in other embodiments, the formed plate can include more than one working fluid flow path 138 on each side. For example, the formed plate may include two working fluid flow paths on each side arranged similarly to the flow paths 60 and 62 of the inserts 56 and 58 of FIG. 5.

While certain embodiments of the invention have been described with reference to the operation of a heat exchanger within a Rankine cycle waste heat recovery system, it should be recognized that the teachings of the present invention may as well be useful in other heat exchange systems that include the vaporization of a fluid. By way of example only, a refrigerant system might derive benefit from a heat exchanger similar to the ones described in the foregoing embodiments.

In a typical refrigerant system, a refrigerant (including but not limited to hydrocarbons, fluorocarbons, hydro-fluorocarbons, and the like) is vaporized in a heat exchanger at a relatively low temperature and pressure in order to extract heat energy from another fluid. The refrigerant is then condensed to a liquid state in another heat exchanger in order to reject the absorbed heat energy, either as waste heat or as useful heat.

A refrigerant system may be operated as an air conditioning system, wherein the heat energy is extracted from an air stream in order to cool and/or dehumidify the air stream for delivery to a conditioned space. Alternatively, a refrigerant system may be operated as a heat pump system wherein the heat energy is extracted from an unconditioned space and is rejected as useful heat to an air flow in order to heat a conditioned space. Alternatively, a refrigerant system may be operated as a chiller system wherein heat is extracted from a liquid coolant loop in order to provide a supply of low temperature coolant.

In some embodiments of the invention, the heat exchanger 20 and/or 131 might be useful within a refrigerant system in order to vaporize a refrigerant working fluid flowing through the plate assembly 34 or the formed plate 120. A flow of fluid such as air or coolant may be directed along the flow paths for the exhaust, in order to provide the heat of vaporization for the refrigerant working fluid.

Thus, the invention provides, among other things, a heat exchanger that includes a combination of counter flow and parallel flow circuiting of the working fluid to provide higher thermal effectiveness and a level of passive temperature control to minimize thermal stress in the heat exchanger and inhibit thermal breakdown of the working fluid and any lubricant. Various features and advantages of the invention are set forth in the following claims.

We claim:

1. A heat exchanger to vaporize a working fluid with heat from a hot gas, the heat exchanger comprising:
   a hot gas inlet located at a first end of the heat exchanger;
   a hot gas outlet located at a second end of the heat exchanger opposite the first end;
   a hot gas flow path extending from the hot gas inlet to the hot gas outlet and comprising first and second pluralities of parallel hot gas flow conduits; and
   a working fluid flow path extending from a working fluid inlet adjacent to the second end to a working fluid outlet spaced apart from the second end and the first end and comprising:
      a first section adjacent to the second end and fluidly connected to the working fluid inlet to receive a flow of working fluid therefrom and configured to transfer heat to the working fluid from a flow of hot gas passing through the first and second pluralities of hot gas flow conduits;
      a second section fluidly connected to the first section to receive the working fluid therefrom and extending to the first end, the second section configured to transfer heat to the working fluid from the first plurality of hot gas flow conduits but not from the second plurality of hot gas flow conduits; and
      a third section extending from the first end to the working fluid outlet and fluidly connected to the working fluid outlet to deliver the flow of working fluid thereto and fluidly connected to the second section to receive the working fluid therefrom, the third section configured to transfer heat to the working fluid from the second plurality of hot gas flow conduits but not from the first plurality of hot gas flow conduits.

2. The heat exchanger of claim 1, wherein the second section of the working fluid flow path is in counter-flow orientation to the first plurality of hot gas flow conduits and wherein the third section of the working fluid flow path is in co-flow orientation to the second plurality of hot gas flow conduits.

3. The heat exchanger of claim 1, wherein the first and second ends define a longitudinal direction of the heat exchanger, the first plurality of hot gas flow conduits is centrally located along a transverse direction normal to the longitudinal direction, and the second plurality of hot gas flow conduits is located at opposing ends of the heat exchanger in the transverse direction.

4. The heat exchanger of claim 1, further comprising:
   a plurality of plate pairs, each comprising a first plate and a second plate spaced apart to at least partially define the working fluid flow path therebetween; and
   fins located between adjacent ones of the plurality of plate pairs, the fins and plate pairs together at least partially defining the first and second pluralities of parallel hot gas flow conduits.

5. The heat exchanger of claim 1, wherein the working fluid outlet is adjacent to the first section and spaced apart from the heat sourcing fluid outlet by the first section, and wherein the working fluid outlet is spaced apart from the heat sourcing fluid inlet by the third section.

6. The heat exchanger of claim 1, wherein the first section includes a first cross-counter flow path section and a second cross-counter flow path section, wherein the first cross-counter flow path section is upstream of the second cross-counter flow path section and defines a more tortuous flow path than the second cross-counter flow path section.

7. The heat exchanger of claim 1, wherein the first section includes a plurality of cross-flow paths relative to the heat sourcing fluid flow path and a plurality of counter-flow paths relative to the heat sourcing fluid flow path.

8. The heat exchanger of claim 4, wherein the third section is fluidly connected to the second section by way of portions of the working fluid flow path located between the first and second plates of each of the plurality of plate pairs.

9. The heat exchanger of claim 4, each of the plurality of plate pairs further comprising an insert, the insert and the first and second plates together defining a plurality of parallel flow channels for the working fluid.

10. The heat exchanger of claim 9, wherein the insert comprises a formed plate having corrugations formed therein to at least partially define the plurality of parallel flow channels for the working fluid on both a first side and an opposite second side of the formed plate.

11. The heat exchanger of claim 9, wherein the insert comprises a first and a second essentially planar stacked metal sheets, each sheet including a plurality of openings, the openings in the first sheet cooperating with the openings in the second sheet to at least partially define the plurality of parallel flow channels for the working fluid, and wherein the first sheet is a mirror image of the second sheet.

12. The heat exchanger of claim 6, wherein the first cross-counter flow path section is adjacent to the working fluid inlet.

13. The heat exchanger of claim 7, wherein the plurality of cross-flow paths includes successive cross-flow paths extending in opposing directions.

14. A heat exchanger to transfer heat from a heat sourcing fluid to a working fluid, comprising:
a heat sourcing fluid flow path extending in a longitudinal direction of the heat exchanger from a heat sourcing fluid inlet to a heat sourcing fluid outlet; and
a working fluid flow path extending from a working fluid inlet to a working fluid outlet, having a plurality of flow arrangements with respect to the heat sourcing fluid flow path including a counter-cross-flow arrangement, a counter-flow arrangement, and a co-flow arrangement, the working fluid flow path comprising:
a first section, fluidly connected to the working fluid inlet to receive a flow of working fluid therefrom, defining the counter-cross-flow arrangement;
a second section, fluidly connected to the first section to receive the working fluid therefrom, defining the counter-flow arrangement; and
a third section, fluidly connected to the working fluid outlet to deliver the flow of working fluid thereto and fluidly connected to the second section to receive the working fluid therefrom, defining the co-flow arrangement.

15. The heat exchanger of claim 14, wherein the second section and the third section extend over a common portion of the heat exchanger along the longitudinal direction.

16. The heat exchanger of claim 14, wherein the first section is adjacent to the heat sourcing fluid outlet and wherein both the second and the third sections are adjacent to the heat sourcing fluid inlet.

17. The heat exchanger of claim 14, wherein the heat sourcing fluid flow path comprises a first and a second plurality of flow channels extending continuously through the heat exchanger, fluid flowing through the first plurality of flow channels transferring heat to fluid flowing through the second section of the working fluid flow path but not through fluid flowing through the third section of the working fluid flow path, and fluid flowing through the second plurality of flow channels transferring heat to fluid flowing through the third section of the working fluid flow path but not through fluid flowing through the first section of the working fluid flow path.

18. The heat exchanger of claim 14, wherein the first section includes a fluid distribution region immediately adjacent the working fluid inlet.

19. The heat exchanger of claim 17, wherein fluid flowing through the first plurality of flow channels transfers heat to fluid flowing through the first section of the working fluid flow path after having first transferred heat to fluid flowing through the second section of the working fluid flow path, and wherein fluid flowing through the second plurality of flow channels transfers heat to fluid flowing through the first section of the working fluid flow path after having first transferred heat to fluid flowing through the third section of the working fluid flow path.

20. A heat exchanger to transfer heat from a heat sourcing fluid to a working fluid, comprising:
a heat sourcing fluid inlet located at a first end of the heat exchanger;
a heat sourcing fluid outlet located at a second end of the heat exchanger opposite the first end;
a heat sourcing fluid flow path extending from the heat sourcing fluid inlet to the heat sourcing fluid outlet and comprising first and second pluralities of parallel heat sourcing fluid flow conduits; and
a plurality of working fluid flow passages to convey the working fluid through the heat exchanger, each of the working fluid flow passages including:
a first portion wherein the working fluid travels in a cross-counter flow orientation to the heat sourcing fluid and wherein the working fluid receives heat from the heat sourcing fluid in both the first and second pluralities of parallel heat sourcing fluid flow conduits;
a second portion downstream of the first portion wherein the working fluid travels in a counter-flow orientation to the heat sourcing fluid and wherein the working fluid receives heat from the heat sourcing fluid in the first plurality of parallel heat sourcing fluid flow conduits but not from the heat sourcing fluid in the second plurality of parallel heat sourcing fluid flow conduits; and
a third portion downstream of the second portion wherein the working fluid travels in a co-flow orientation to the heat sourcing fluid and wherein the working fluid receives heat from the heat sourcing fluid in the second plurality of parallel heat sourcing fluid flow conduits but not from the heat sourcing fluid in the first plurality of parallel heat sourcing fluid flow conduits.

21. The heat exchanger of claim 20, wherein each of the plurality of working fluid passages are hydraulically isolated from one another along at least the first, second, and third portions.

22. The heat exchanger of claim 20, wherein the plurality of working fluid flow passages are defined by inserts between pairs of flat plates.

23. The heat exchanger of claim 22, wherein the inserts comprise corrugated formed plates.

24. The heat exchanger of claim 22, wherein the inserts comprise a first and a second essentially planar stacked metal sheets, each sheet including a plurality of openings, the openings in the first sheet cooperating with the openings in the second sheet to at least partially define the plurality of working fluid flow passages.

\* \* \* \* \*